(12) United States Patent
Tung et al.

(10) Patent No.: US 6,780,916 B2
(45) Date of Patent: Aug. 24, 2004

(54) OXYGEN-SCAVENGING RESIN COMPOSITIONS HAVING LOW HAZE

(75) Inventors: Deborah Tung, Tallmadge, OH (US); Edwin A. Sisson, Akron, OH (US); Roy A. Leckonby, Uniontown, OH (US)

(73) Assignee: M & G USA Corporation, Apple Grove, WV (US)

( * ) Notice: Subject to any disclaimer, the term of this patent is extended or adjusted under 35 U.S.C. 154(b) by 0 days.

(21) Appl. No.: 09/916,671

(22) Filed: Jul. 26, 2001

(65) Prior Publication Data

US 2003/0027912 A1 Feb. 6, 2003

(51) Int. Cl.$^7$ .............................. C08K 3/08; C08J 3/22
(52) U.S. Cl. ..................... 524/440; 524/403; 524/409; 524/439; 524/441; 523/351; 428/35.8
(58) Field of Search ......................... 523/351; 524/403, 524/409, 430, 434, 435, 436, 437, 439, 461, 440

(56) References Cited

U.S. PATENT DOCUMENTS

| | | | |
|---|---|---|---|
| 4,230,595 A | * | 10/1980 | Yamaji et al. |
| 4,250,078 A | | 2/1981 | McFarlane et al. |
| 4,476,272 A | | 10/1984 | Pengilly |
| 4,535,118 A | | 8/1985 | Pengilly |
| 4,595,715 A | * | 6/1986 | Kuze et al. |
| 5,008,230 A | * | 4/1991 | Nichols |
| 5,153,038 A | | 10/1992 | Koyama et al. |
| 5,288,784 A | | 2/1994 | Minayoshi |
| 5,419,936 A | | 5/1995 | Tindale |
| 5,434,000 A | * | 7/1995 | Konagaya et al. |
| 5,565,545 A | | 10/1996 | Kriesche et al. |
| 5,693,690 A | | 12/1997 | Hayashi et al. |
| 5,744,056 A | | 4/1998 | Venkateshwaran et al. |
| 5,830,544 A | | 11/1998 | Kerscher et al. |
| 5,885,481 A | | 3/1999 | Venkateshwaran et al. |
| 5,902,373 A | | 5/1999 | Vännman et al. |
| 6,022,920 A | | 2/2000 | Maxwell et al. |
| 6,034,167 A | | 3/2000 | Tung et al. |
| 6,063,503 A | | 5/2000 | Hatakeyama et al. |
| 6,083,585 A | | 7/2000 | Cahill et al. |
| 6,113,997 A | | 9/2000 | Massey et al. |
| 6,159,416 A | | 12/2000 | Kawakami et al. |
| 6,218,017 B1 | * | 4/2001 | Yamashita et al. |
| 6,365,245 B2 | * | 4/2002 | Blinka et al. |
| 2002/0077405 A1 | * | 6/2002 | Edwards et al. |

OTHER PUBLICATIONS

Aldrich Chemical Cat. Antimony Powder. p. 122, 1988, W.I.*

* cited by examiner

*Primary Examiner*—Tae H. Yoon
(74) *Attorney, Agent, or Firm*—Renner, Kenner, Greive, Bobak, Taylor & Weber

(57) ABSTRACT

A resin composition provides good optical properties when stretched and efficient oxygen-scavenging, the resin composition comprising a film-forming polyester and an effective amount of oxygen-scavenging particles, wherein the particles have a particle size distribution such that particles of less than about 25 microns in size do not exceed a concentration defined by a formula that includes the apparent density of the particles. Another resin composition comprises a film-forming polyester and from about 50 to about 2500 parts by weight of iron per million by weight of the resin, wherein the amount of iron particles having a size of less than about 20 microns does not exceed about 800 parts per million by weight of the resin. A method is also provided for incorporating high levels of oxygen-scavenging particles into a film-forming polyester resin composition with low haze when stretched.

40 Claims, No Drawings

OXYGEN-SCAVENGING RESIN COMPOSITIONS HAVING LOW HAZE

BACKGROUND OF THE INVENTION

Thermoplastic resins such as polyethylene terephthalate (PET) are commonly used to manufacture packaging materials. PET processed under the right conditions produces high strength articles with excellent gas barrier properties. Foods, beverages, and medicines can deteriorate or spoil if exposed to oxygen. To improve shelf-life and flavor retention of products such as foods, beverages, and medicines, therefore, the barrier protection provided by PET is often supplemented with additional layers of packaging material or with the addition of oxygen scavengers.

Adding a layer of gas barrier film is known as passive-barrier packaging. Polyvinylidene dichloride (PVDC) is an example of a film commonly used for this purpose due to its excellent oxygen barrier properties. This method is not preferred, however, because it adds cost to packaging construction and does not reduce the levels of oxygen already present in the package.

Adding oxygen scavengers to the PET resin is known as active-barrier packaging. This approach to protecting oxygen-sensitive products is two-fold; the packaging prevents oxygen from reaching the product from the outside, and also absorbs any oxygen present in the container. In some applications, small packets or sachets containing oxygen scavengers are added to the packaging container. Iron powder is commonly used for oxygen scavenging in food packages. Iron reacts with the oxygen and forms iron oxide. Most applications also utilize a salt and a moisture absorber as reaction-enhancing agents to increase the effectiveness of the iron powder. Even when a salt and a moisture absorber are added, one difficulty with scavenger systems utilizing iron is the inefficiency of the oxidation reaction. High loadings of iron powder, on the order of 1000–2500 parts per million, are typically required to obtain sufficient oxygen absorption. Unfortunately, previous attempts at preparing resin compositions comprising high levels of iron have resulted in packaging materials with poor optical properties. Typically, bottles prepared from such resin compositions are dark in color or translucent. Haze values for these bottles are generally high, and clarity is lacking.

Thus, there remains a need for packaging materials having acceptable visual aspects and comprising oxygen scavenging resin compositions. This invention relates to an oxygen-scavenging resin composition having utility in packaging and other applications. More specifically, this invention relates to a film-forming, oxygen-scavenging polyester resin composition having low haze. The present invention further relates to a method for incorporating high levels of oxygen-scavenging particles into a film-forming polyester resin composition with low haze.

BRIEF SUMMARY OF THE INVENTION

In general the present invention provides a resin composition comprising: a film-forming polyester; and an effective amount of oxygen-scavenging particles comprising at least one oxygen-scavenging element; wherein the particles have a particle size distribution such that particles of less than about 25 microns in size do not exceed a concentration defined by the formula $$ppm = 512.3 \times d$$

wherein ppm is the approximate concentration of particles of less than about 25 microns in size in parts per million by weight, and d is the apparent density of the particles of less than about 25 microns in size in grams per cubic centimeter.

The present invention also includes a resin composition comprising: a film-forming polyester; and an effective amount of oxygen-scavenging iron particles, wherein the iron particles have a particle size distribution such that particles of less than about 25 microns in size do not exceed about 1250 parts per million by weight of the resin.

The present invention also includes a resin composition comprising a film-forming polyester and from about 50 to about 2500 parts by weight of iron particles per million parts by weight of the resin, wherein the concentration of iron particles of less than about 25 microns in size does not exceed about 1250 parts per million by weight of the resin.

The present invention also includes a polyester resin composition for use in forming transparent articles having low haze, the resin composition comprising from about 50 to about 2500 parts by weight of iron particles per million by weight of the resin, wherein said transparent articles have a Hunter haze value of about 10% or less.

The present invention also includes an article formed from a resin composition comprising an effective amount of oxygen-scavenging particles, wherein the Hunter haze value of the article is about 10% or less.

The present invention also includes a method for incorporating high levels of oxygen-scavenging particles into a film-forming polyester resin composition with low haze comprising the steps of: providing an effective amount of oxygen-scavenging particles comprising at least one oxygen-scavenging element, wherein the particles have a particle size distribution such that particles of less than about 25 microns in size do not exceed a concentration defined by the formula $$ppm = 512.3 \times d$$

wherein ppm is the approximate concentration of particles of less than about 25 microns in size in parts per million by weight, and d is the apparent density of the particles of less than about 25 microns in size in grams per cubic centimeter; adding said oxygen-scavenging particles to a polyester resin composition during one or more of the process steps of: melt phase polymerization of the polyester; post polymerization and prior to pelletization; solid state polymerization of the polyester; and extrusion.

The present invention also includes a resin composition comprising: a film-forming polyester; and particulates; wherein the particulates have a particle size distribution such that particles of less than about 25 microns in size do not exceed a concentration defined by the formula $$ppm = 512.3 \times d$$

wherein ppm is the approximate concentration of particles of less than about 25 microns in size in parts per million by weight, and d is the apparent density of the particles of less than about 25 microns in size in grams per cubic centimeter.

Advantageously, the present invention overcomes the problems associated with the prior art by providing a thermoplastic resin composition which contains an effective amount of iron or other oxygen scavenger and which has acceptable color and haze characteristics. The iron or other oxygen scavenger is present in an amount sufficient to effectively scavenge oxygen and provide longer shelf life for oxygen-sensitive materials. The particle size of the oxygen scavenger is optimized to provide effective scavenging activity, while reducing dark coloration and haze.

DETAILED DESCRIPTION OF THE INVENTION

The present invention is directed to a film-forming, oxygen-scavenging resin composition having low haze.

Suitable thermoplastic polymers for use in the present invention include any thermoplastic homopolymer or copolymer. Examples of thermoplastic polymers include polyamides, such as nylon 6, nylon 66 and nylon 612, linear polyesters, such as polyethylene terephthalate, polybutylene terephthalate, polytrimethylene terephthalate, and polyethylene naphthalate, branched polyesters, polystyrenes, polycarbonate, polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer, polyethylene, polypropylene, ethylenepropylene copolymers, poly(1-hexene), poly(4-methyl-1-pentene), poly(1-butene), poly(3-methyl-1-butene), poly(3-phenyl-1-propene) and poly(vinylcyclohexane). Preferably, the thermoplastic polymer used in the present invention comprises a polyester polymer or copolymer.

Polymers of the present invention can be prepared by conventional polymerization procedures well-known in the art. The polyester polymers and copolymers may be prepared by melt phase polymerization involving the reaction of a diol with a dicarboxylic acid, or its corresponding ester. Various copolymers of multiple diols and diacids may also be used.

Suitable dicarboxylic acids include those comprising from about 6 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic esters.

These acids or esters may be reacted with an aliphatic diol having from about 2 to about 10 carbon atoms, a cycloaliphatic diol having from about 7 to about 14 carbon atoms, an aromatic diol having from about 6 to about 15 carbon atoms, or a glycol ether having from 4 to 10 carbon atoms. Suitable diols include, but are not limited to, 1,4-butenediol, trimethylene glycol, 1,6-hexanediol, 1,4-cyclohexanedimethanol, diethylene glycol, resorcinol, and hydroquinone.

Trifunctional or tetrafunctional comonomers can also be used. Suitable comonomers include, but are not limited to, trimellitic anhydride, trimethylopropane, pyromellitic dianhydride, and pentaerythritol. Polyester-forming polyacids or polyols can also be used.

One preferred polyester is polyethylene terephthalate (PET) formed from the approximate 1:1 stoichiometric reaction of terephthalic acid, or its ester, with ethylene glycol. Another preferred polyester is polyethylene naphthalate (PEN) formed from the approximate 1:1 stoichiometric reaction of naphthalene dicarboxylic acid, or its ester, with ethylene glycol. Yet another preferred polyester is polybutylene terephthalate (PBT). Copolymers of PET, copolymers of PEN, and copolymers of PBT are also preferred.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred.

Another preferred polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Aromatic and aliphatic acids which may be copolymerized include, for example, isophthalic acid and 2,6-naphthalene dicarboxylic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis (acetyl-acetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The polymer of this invention may also contain small amounts of phosphorous compounds, such as phosphates, and a catalyst such as a cobalt compound, that tends to impart a blue hue.

The melt phase polymerization described above may be followed by a crystallization step, then a solid phase polymerization (SSP) step to achieve the intrinsic viscosity necessary for bottle manufacture. The crystallization and polymerization can be performed in a tumbler dryer reaction in a batch-type system. Alternatively, the crystallization and polymerization can be accomplished in a continuous solid state process whereby the polymer flows from one vessel to another after its predetermined treatment in each vessel.

The crystallization conditions preferably include a temperature of from about 100° C. to about 150° C. The solid phase polymerization conditions preferably include a temperature of from about 200° C. to about 232° C., and more preferably from about 215° C. to about 232° C. The solid phase polymerization may by carried out for a time sufficient to raise the intrinsic viscosity to the desired level, which will depend upon the application. For a typical bottle application, the preferred intrinsic viscosity is from about 0.65 to about 1.0 deciliter/gram. The time required to reach this viscosity may range from about 8 to about 21 hours.

In one embodiment of the invention, the polyester used in the present invention may comprise recycled polyester.

The oxygen-scavenging resin composition of the present invention further comprises oxygen-scavenging particles. Suitable particles comprise at least one oxidizable material capable of reacting with molecular oxygen. Desirably, materials are selected that do not react with oxygen so quickly that handling of the materials is impracticable. Therefore, stable oxygen-scavenging materials that do not readily explode or burn upon contact with molecular oxygen are preferred. From a standpoint of food safety, materials of low toxicity are preferred, however with proper precautions, this is not a limitation. The particles should not adversely affect the organoleptic properties of the final product. Preferably, the oxygen-scavenging particles comprise an oxygen-scavenging element selected from calcium, magnesium, scandium, titanium, vanadium, chromium, manganese, iron, cobalt, nickel, copper, zinc, silver, tin, aluminum, antimony, germanium, silicon, lead, cadmium, rhodium, and combinations thereof. More preferably, the oxygen-scavenging particles comprise an oxygen-scavenging element selected from calcium, magnesium, titanium, vanadium, manganese, iron, cobalt, nickel, copper, zinc, or tin. Even more preferably, the oxygen-scavenging particles comprise iron. It will be understood that these oxygen-scavenging elements may be present as mixtures, in compounds such as oxides and salts, or otherwise combined with other elements, with the proviso that the oxygen-scavenging elements are capable of reacting with molecular oxygen. Metal alloys comprising at least one oxygen-scavenging element are also suitable. The oxygen-scavenging particles may contain impurities that do not affect the practice of the present invention.

It is known in the art that certain substances enhance the oxygen scavenging reaction. In a preferred embodiment of the present invention, the oxygen-scavenging particles are pre-treated with one or more reaction-enhancing agents that facilitate the oxygen scavenging reaction. Any of the reaction-enhancing agents known in the art may be used.

In one embodiment of the present invention, the resin composition comprises metallic iron particles. Metallic iron is used so that the iron is able to react with oxygen in its function as an oxygen scavenger. Alloys or mixtures containing metallic iron may also be used. Furthermore, it is to be understood that the metallic iron may contain impurities that do not effect the practice of the present invention.

The present invention further relates to a method for incorporating high levels of oxygen-scavenging particles into a polyester resin composition with low haze.

The oxygen-scavenging particles may be admixed with the thermoplastic polymer during or after polymerization, with the polymer melt, or with the molding powder or pellets from which the injection molded articles are formed. Accordingly, the oxygen-scavenging particles may be added during any of the process steps, such as during melt phase polymerization, after the melt phase polymerization (post polymerization) but before pelletization, during solid state polymerization, and during extrusion. Alternatively, a masterbatch of oxygen-scavenging resin may be prepared, and then mixed or blended with additional resin. Preferably, the masterbatch contains a relatively high amount of oxygen-scavenging particles, and the desired oxygen-scavenging particle concentration in the product polymer is achieved by mixing or blending the masterbatch with an amount of additional resin.

In a preferred embodiment of the present invention, the oxygen-scavenging particles are pre-treated with a reaction-enhancing agent to facilitate the oxygen-scavenging reaction. Preferably, this pre-treatment occurs prior to admixing the oxygen-scavenging particles with the thermoplastic polymer.

The oxygen-scavenging particles are present in an effective amount for adequate oxygen-scavenging ability. If too few oxygen-scavenging particles are present, some oxygen may be able to pass through the resin without being scavenged. If too many oxygen-scavenging particles are present, the resin may be discolored prior to oxygen scavenging, or the resin may be rough in surface texture. The amount required for adequate oxygen-scavenging ability depends on such factors as the application, the type of polymer used, the amount of gas barrier protection desired, the type of oxygen-scavenging particles, the particle size of the oxygen-scavenging particles, and moisture content. Preferably, the oxygen-scavenging resin composition of the present invention comprises at least about 50 parts per million oxygen-scavenging particles by weight of the resin. It has been found that film or bottle articles formed from oxygen-scavenging resins comprising up to about 2500 parts per million oxygen-scavenging particles can have acceptable haze characteristics. For applications where haze is not an issue of concern, it will be appreciated that the amount of iron or other oxygen-scavenging particles may be much higher. Further characterization of the oxygen-scavenging particles that are necessary for practice of the present invention is provided hereinbelow.

It will be understood that, within any given sample of oxygen-scavenging particles, the particles are not all the same size, but comprise a range of particle sizes. Thus, any given sample of oxygen-scavenging particles will have a particle size distribution, which is a description of the range of particle sizes and the amounts of particles of each size. Such a sample may also be described by an average particle size, as measured by any of the standard techniques known in the art. The sample may alternatively be described by a particle size range, or as less than or equal to a given particle size. These designations may be determined by sieving techniques, or other techniques known in the art.

The composition of the present invention may optionally further comprise one or more reaction-enhancing agents known in the art to facilitate the oxygen-scavenging reaction. Examples of known reaction-enhancing agents include, but are not limited to, hydroscopic materials and salts. The reaction-enhancing agents may be added to the polymer melt, or during extrusion.

The composition of the present invention may optionally yet further comprise one or more components selected from the group consisting of impact modifiers, surface lubricants, denesting agents, stabilizers, crystallization aids, antioxidants, ultraviolet light absorbing agents, catalyst deactivators, colorants, nucleating agents, acetaldehyde reducing agents, reheat reducing agents, fillers, branching agents, blowing agents, accelerants, and the like. These are generally well known and their presence or absence does not effect practice of the present invention which is based upon the addition of an effective amount of oxygen-scavenging particles to the composition.

The oxygen-scavenging resin of the present invention may be formed into bottle preforms and then into bottles. A "preform" is a formed structure that is expanded in a mold to form a bottle. The manufacture of preforms and bottles is known in the art, and any one of a number of suitable techniques can be used to prepare the preform and bottle. Alternately, the oxygen-scavenging resin may be formed into film, pouches, or other packaging material.

In general, polyester bottles are prepared in blow-molding processes carried out by heating the preform above the polyester glass transition temperature, placing the heated preform into a mold of the desired bottle form, injecting air into the mold to force the preform into the shape of the mold, and ejecting the molded bottle from the mold onto a conveyor belt.

The oxygen-scavenging polyester resin of the present invention advantageously possesses both effective oxygen-scavenging functionality and acceptable optical properties when stretched. The optical properties of polymers are related to both the degree of crystallinity and the actual polymer structure. Transparency is defined as the state permitting perception of objects through a sample. Transmission is the light transmitted. Transparency is measured as the amount of undeviated light. In other words, transparency is the original intensity of the incident radiation minus all light absorbed, scattered, or lost through any other means.

Many polymers are transparent, but polymers that are transparent to visible light may become opaque as the result of the presence of additives such as fillers, stabilizers, flame retardants, moisture, and gases. The opacity results from light-scattering processes occurring within the material. The light scattering reduces the contrast between light, dark, and other colored parts of objects viewed through the material and produces a milkiness or haze in the transmitted image. Haze is a measure of the amount of light deviating from the direction of transmittancy of the light by at least 2.5 degrees.

The color and brightness of a polyester article can be observed visually, and can also be quantitatively determined by a HunterLab ColorQuest Spectrometer. This instrument uses the 1976 CIE a*, b*, and L* designations of color and brightness. Rd is also a measure of brightness. An a* coordinate defines a color axis wherein plus values are toward the red end of the color spectrum and minus values are toward the green end. The b* coordinate defines a second color axis, wherein plus values are toward the yellow end of the spectrum and minus values are toward the blue end. Higher L* values indicate enhanced brightness of the material.

While polyester crystallized through strain hardening (stretching) has excellent optical properties, including high transmittance and low light scattering, particulate additives can reduce the transparency and increase the haze. Generally, the haze of an article, such as a bottle or film, is measured visually. However, the haze of an article or resin can be quantitatively indicated by using ASTM method D1003, "Haze and Luminous Transmittance of Transparent Plastic." The instrument used for this method is a HunterLab ColorQuest Spectrometer. Two factors which must be taken into account when accurately measuring haze and comparing haze values are the thickness of the article being measured, and the blow window.

In order to establish the proper temperature and processing time to obtain the lowest haze value due only to the crystallization process of the polyester resin, a blow window graph is constructed. The blow window graph shows haze as a function of the heat exposure time of the preform. The graph is usually constructed by creating isotherms and heating each preform at the same temperature for different lengths of time. The heated preform is then stretched and the haze measurement is performed on the stretched portion. Several different temperatures are chosen. Generally, a resin will have a best temperature that produces the lowest haze value, and that temperature is used to conduct the remaining evaluations. In the work described herein, one temperature was chosen and the parameter of time was varied.

Advantageously, it has been found that when the oxygen-scavenging particles comprise iron, and the particle size distribution of the iron is such that particles of less than or equal to about 25 microns do not exceed about 1250 parts per million by weight of the resin, bottles and other packaging materials made by using the iron-containing thermoplastic resin composition have acceptable color and haze characteristics. Preferably, iron particles of less than about 20 microns do not exceed about 800 parts per million by weight of the resin. More preferably, particles of less than about 20 microns do not exceed about 500 parts per million by weight of the resin. Even more preferably, particles of less than about 20 microns do not exceed about 100 parts per million by weight of the resin. Desirably, iron particles of less than about 10 microns do not exceed about 800 parts per million by weight of the resin. More desirably, iron particles of less than about 10 microns do not exceed about 500 parts per million by weight of the resin. Even more desirably, iron particles of less than about 10 microns do not exceed about 100 parts per million by weight of the resin. Preferably, iron particles of less than or equal to about 5 microns do not exceed about 500 parts per million by weight of the resin. More preferably, iron particles of less than or equal to about 5 microns do not exceed about 100 parts per million by weight of the resin. Accordingly, it is to be understood that the recitations throughout the specification and claims of "less than about 25 microns" are intended to include the smaller iron particle sizes of 20 microns, 10 microns, 5 microns, and less than 5 microns, depending upon the size that is preferred. Similarly, recitations of "do not exceed about 1250 parts per million" are intended to include the smaller amounts of 800 parts per million, 500 parts per million and 100 parts per million, depending upon the amount that is preferred. It will be appreciated that particles larger than the thickness of the bottles and other packaging materials made by using the high-iron thermoplastic resin composition may produce a rough surface, so that significant amounts of such large particles are to be avoided.

More generally, the advantageous particle size distribution of the oxygen-scavenging particles is determined as a function of the apparent density of the particles. The density of a metal powder particle is not necessarily identical to the density of the material from which it is produced because of the internal porosity of the particle. Apparent density refers to the weight of a unit volume of loose powder, usually expressed in grams per cubic centimeter ($g/cm^3$). The characteristics of a powder that determine its apparent density are discussed in Peter K. Johnson, "Powder Metallurgy" in *Kirk Othmer Encyclopedia of Chemical Technology*, §§4.1, 4.2 (1995). Typical apparent density values for iron particles reported by Johnson range from about 0.97 to about 3.4 grams per cubic centimeter. The supplier of the iron particles employed herein indicated that the apparent density of the particles was approximately 2.44 grams per cubic centimeter. It will be understood that preferred concentrations and particle size distributions of iron particles recited herein apply to iron particles having an apparent density of from about 2.3 to about 2.5 grams per cubic centimeter. When particles comprising iron or other materials and having an apparent density significantly distinct from this range are employed, the advantageous particles size distribution of the particles is determined by the following formulae.

Preferably, the particle size distribution of the oxygen-scavenging particles is such that particles of less than or equal to about 25 microns do not exceed a concentration defined by the formula wherein ppm is the approximate concentration of particles of less than about 25 microns in size in parts per million by weight, and d is the apparent density of the particles of less than about 25 microns in size in grams per cubic centimeter. The constant 512.3 in the preceding formula was derived from a calculation based upon a particle size distribution such that particles of less than or equal to about 25 microns do not exceed a concentration of 1250 parts per million by weight, and wherein the particles have an apparent density of about 2.44 grams per cubic centimeter.

More preferably, the particle size distribution of the oxygen-scavenging particles is such that particles of less than or equal to about 20 microns do not exceed a concentration defined by the formula $$ppm=327.9 \times d$$

wherein ppm is the approximate concentration of particles of less than about 20 microns in size in parts per million by weight, and d is the apparent density of the particles of less than about 20 microns in size in grams per cubic centimeter. The constant 327.9 was determined in the same manner as in the preceding formula, as were each of the formulae which follow.

Even more preferably, the particle size distribution of the oxygen-scavenging particles is such that particles of less than or equal to about 20 microns do not exceed a concentration defined by the formula $$ppm=204.9 \times d$$

wherein ppm is the approximate concentration of particles of less than about 20 microns in size in parts per million by weight, and d is the apparent density of the particles of less than about 20 microns in size in grams per cubic centimeter.

Still more preferably, the particle size distribution of the oxygen-scavenging particles is such that particles of less than or equal to about 20 microns do not exceed a concentration defined by the formula $$ppm=41.0 \times d$$

wherein ppm is the approximate concentration of particles of less than about 20 microns in size in parts per million by weight, and d is the apparent density of the particles of less than about 20 microns in size in grams per cubic centimeter.

Desirably, the particle size distribution of the oxygen-scavenging particles is such that particles of less than or equal to about 10 microns do not exceed a concentration defined by the formula $$ppm=327.9 \times d$$

wherein ppm is the approximate concentration of particles of less than about 10 microns in size in parts per million by weight, and d is the apparent density of the particles of less than about 10 microns in size in grams per cubic centimeter.

More desirably, the particle size distribution of the oxygen-scavenging particles is such that particles of less than or equal to about 10 microns do not exceed a concentration defined by the formula $$ppm=204.9 \times d$$

wherein ppm is the approximate concentration of particles of less than about 10 microns in size in parts per million by weight, and d is the apparent density of the particles of less than about 10 microns in size in grams per cubic centimeter.

Even more desirably, the particle size distribution of the oxygen-scavenging particles is such that particles of less than or equal to about 10 microns do not exceed a concentration defined by the formula $$ppm=41.0 \times d$$

wherein ppm is the approximate concentration of particles of less than about 10 microns in size in parts per million by weight, and d is the apparent density of the particles of less than about 10 microns in size in grams per cubic centimeter.

Preferably, the particle size distribution of the oxygen-scavenging particles is such that particles of less than or equal to about 5 microns do not exceed a concentration defined by the formula $$ppm=204.9 \times d$$

wherein ppm is the approximate concentration of particles of less than about 5 microns in size in parts per million by weight, and d is the apparent density of the particles of less than about 5 microns in size in grams per cubic centimeter.

More preferably, the particle size distribution of the oxygen-scavenging particles is such that particles of less than or equal to about 5 microns do not exceed a concentration defined by the formula $$ppm=41.0 \times d$$

wherein ppm is the approximate concentration of particles of less than about 5 microns in size in parts per million by weight, and d is the apparent density of the particles of less than about 5 microns in size in grams per cubic centimeter.

The oxygen-scavenging resin having low haze, according to the present invention, can be stretched into bottles having a Hunter haze number of, preferably, less than about 10 percent, more preferably less than about 8 percent, and even more preferably less than about 5 percent, at optimum blow window conditions. While higher than the haze numbers for polyester samples comprising no iron or other oxygen-scavenging particles, these haze values are well within the range of values acceptable for many commercial applications. Furthermore, some applications may tolerate a higher haze value, depending upon the thickness of the film and the tint of the film. When a film or bottle wall or other article has a thickness of from about 12 to about 15 mils, and is not significantly tinted, the haze values stated above give acceptable optical characteristics. When a film is stretched thinner than this, higher haze values will still give acceptable optical characteristics. Likewise, when a tint is added, higher haze values are acceptable. Accordingly, if a higher haze can be tolerated, then higher levels of oxygen-scavenging particles, for a given particle size, can be present and still produce acceptable optical characteristics.

The present invention also provides a resin composition comprising: a film-forming polyester; and particulates; wherein the particulates have a particle size distribution such that particles of less than about 25 microns in size do not exceed a concentration defined by the formula $$ppm=512.3 \times d$$

wherein ppm is the approximate concentration of particles of less than about 25 microns in size in parts per million by weight, and d is the apparent density of the particles of less than about 25 microns in size in grams per cubic centimeter. The particulates may or may not comprise oxygen-scavenging elements. Suitable particulates include, but are not limited to, ceramic, plastic, and metal particulates, molecular sieves, and the like.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

General Experimentation

A PET resin was prepared by reacting terephthalic acid and ethylene glycol to make a melt phase polymer, sometimes referred to as a feed polymer. Other polyester resins containing isophthalate or naphthalate were also prepared. This low molecular weight feed polymer was crystallized and solid state polymerized to prepare a high molecular weight PET base resin. Samples of iron particles having various particles sizes were obtained. The apparent density of the iron particles was approximately 2.44 grams per cubic centimeter. Thus, the iron particles used in Example No. 3 had a particle size range of about 25 to about 38 microns. It will be understood that such a sample can be prepared, for example, by using sieves. The iron particles were added to polyester resin, by using a metered feeder on a twin-screw extruder, to form a masterbatch of resin containing 2 percent by weight iron-containing resin composition. This masterbatch was blended with the base resin to obtain the desired concentration. The base resin/iron mixtures were dried under vacuum at 325° F. (163° C.) for 18 hours. The dried resins were transferred to a Novotec drying hopper of a Nissei ASB 50T Injection Blow-Molding machine. The hopper was heated to 325° F. (163° C.) and set for a dew point of −40° F. (−40° C.).

The bottle preforms were heated and blown into bottles in a two-step process. First, the preforms were prepared on a Mini-jector or Nissei machine. Then, the bottles were blown from their preforms on a Cincinnati Milacron Reheat Blow Lab (RHB-L) blow molding machine. The preforms were prepared on the Mini-jector using a cycle time of 45 second, inject time of 15 seconds, with a rear heater temperature of 270° C., a front heater temperature of 275° C., and a nozzle heat of 275° C. The inject pressure was between about 1000 and about 1500 psig. The oven temperature on the Milacron RHB-L was from about 163 to about 177° C. The exposure time was from about 31 to about 52 seconds. The haze measurements were taken on the bottle side-wall, which is the thinned, stretched portion.

The iron particle concentration, average iron particle size, and the haze values at a constant sample thickness and optimum blow window conditions are summarized in Tables 1 and 2. Comparative Example Nos. 1, 6, and 11 contained no iron particles.

TABLE 1

Iron Particles in Stretched Polyester Film Compositions

| Example No. | Fe conc. (ppm) | Particle size (microns) | Optimum reheat time (sec) | Haze (%) |
|---|---|---|---|---|
| 1 | 0 | — | 43 | 1.5 |
| 2 | 1250 | ≦25 | 49 | 7.56 |
| 3 | 1250 | 25–38 | 49 | 4.53 |
| 4 | 1250 | 38–45 | 52 | 4.58 |
| 5 | 1250 | 45–75 | 52 | 4.41 |
| 6 | 0 | — | 43 | 1.5 |
| 7 | 2500 | ≦25 | 46 | 14.08 |
| 8 | 2500 | 25–38 | 46 | 9.13 |
| 9 | 2500 | 38–45 | 46 | 8.45 |
| 10 | 2500 | 45–75 | 40 | 8.56 |

TABLE 2

Iron Particles in Stretched Polyester Film Compositions and Haze Values

| Example No. | Fe conc. (ppm) | Particle size (microns) | Optimum reheat time (sec) | Haze (%) | Rd | L* |
|---|---|---|---|---|---|---|
| 11 | 0 | — | 43 | 1.5 | 78.13 | 90.89 |
| 12 | 100 | 1–3 | 46 | 5.1 | 75.83 | 89.78 |
| 13 | 250 | 1–3 | 40 | 6.98 | 73.44 | 88.66 |
| 14 | 500 | 1–3 | 46 | 9.12 | 68.33 | 86.17 |
| 15 | 800 | 1–3 | 46 | 11.63 | 64.05 | 83.99 |
| 16 | 1000 | 1–3 | 46 | 16.44 | 53.39 | 78.1 |
| 17 | 100 | 3–5 | 49 | 4.55 | 75.78 | 89.76 |
| 18 | 250 | 3–5 | 49 | 6.74 | 75.71 | 79.73 |
| 19 | 500 | 3–5 | 46 | 9.04 | 72.64 | 88.27 |
| 20 | 800 | 3–5 | 46 | 11.8 | 70.45 | 87.21 |
| 21 | 1000 | 3–5 | 46 | 12.99 | 63.46 | 83.68 |
| 22 | 100 | 7–9 | 49 | 5.4 | 77.4 | 90.51 |
| 23 | 250 | 7–9 | 46 | 6.85 | 75.94 | 89.83 |
| 24 | 500 | 7–9 | 43 | 8.49 | 73.72 | 88.79 |
| 25 | 800 | 7–9 | 49 | 7.83 | 72.18 | 88.06 |
| 26 | 1000 | 7–9 | 46 | 8.81 | 70.56 | 87.27 |

Haze values of less than 10% are obtained, even at iron levels of 2500 ppm, when the iron particle size is greater than about 25 microns, as shown in Table 1. At 1250 ppm iron, and also at 2500 ppm iron, the highest haze values were obtained when the average particle size was less than or equal to about 25 microns, i.e., Example Nos. 2 and 7, respectively. Nevertheless, when the iron particle size is less than or equal to about 25 microns, haze values of less than 10% are obtained at iron levels up to about 1250 ppm. As shown in Table 2, when the iron particle size is less than or equal to about 9 microns, haze values of less than 10% are obtained at iron levels up to about 800 ppm. Furthermore, when the iron particle size is less than or equal to about 5 microns, haze values of less than 10% are obtained at iron levels up to about 500 ppm.

As should now be understood, the present invention overcomes the problems associated with the prior art by providing a thermoplastic resin composition which contains an effective amount of oxygen-scavenging particles and which has acceptable color and haze characteristics. The resulting resin can be used to form transparent bottles, films, and other packaging materials. These materials comprise oxygen-scavenging particles in an amount sufficient to effectively scavenge oxygen and provide longer shelf life for oxygen-sensitive materials. Furthermore, these materials have acceptable color and haze characteristics.

While the best mode and preferred embodiment of the invention have been set forth in accord with the Patent Statutes, the scope of this invention is not limited thereto, but rather is defined by the attached claims. Thus, the scope of the invention includes all modifications and variations that may fall within the scope of the claims.

What is claimed is:

1. A resin composition comprising:
   a film-forming polyester; and
   an effective amount of oxygen-scavenging particles comprising at least one oxygen-scavenging element capable of reacting with molecular oxygen; wherein the particles have a particle size distribution such that particles of greater than and less than about 25 microns in size are present, but those particles less than about 25 microns in size do not exceed a concentration defined by the formula $$ppm=512.3\times d$$

wherein ppm is the approximate concentration of particles of less than about 25 microns in size in parts per million by weight, and d is the apparent density of the particles of less than about 25 microns in size in grams per cubic centimeter.

2. The resin composition of claim 1, wherein said polyester comprises linear polyesters or branched polyesters.

3. The resin composition of claim 1, wherein said polyester comprises polyethylene terephthalate, copolymers of polyethylene terephthalate, polyethylene naphthalate, copolymers of polyethylene naphthalate, polybutylene terephthalate, copolymers of polybutylene terephthalate, polytrimethylene terephthalate, or copolymers of polytrimethylene terephthalate.

4. The resin composition of claim 1, wherein said oxygen-scavenging element comprises calcium, magnesium, scandium, titanium, vanadium, chromium, manganese, iron, cobalt, nickel, copper, silver, zinc, tin, aluminum, antimony, germanium, silicon, lead, cadmium, rhodium, or combinations thereof.

5. The resin composition of claim 1, wherein said oxygen-scavenging element comprises iron.

6. The resin composition of claim 1, wherein said effective amount of oxygen-scavenging particles is from about 50 to about 2500 parts per million by weight of the resin.

7. The resin composition of claim 1, wherein said oxygen-scavenging particles have a particle size range of about 20 to about 70 microns.

8. The resin composition of claim 1, wherein said particles of less than about 25 microns in size have an apparent density of about 2.44 grams per cubic centimeter.

9. The resin composition of claim 1, wherein particles of less than about 20 microns in size have an apparent density of about 2.44 grams per cubic centimeter, and do not exceed a concentration of about 800 parts per million by weight of the resin.

10. The resin composition of claim 1, wherein said oxygen-scavenging particles are pre-treated with one or more reaction-enhancing agents.

11. The resin composition of claim 1, wherein bottles produced from said resin have a Hunter haze value of about 10% or less.

12. A resin composition comprising:

a film-forming polyester; and an effective amount of oxygen-scavenging iron particles, wherein the iron particles have a particle size distribution such that particles of less than about 25 microns in size are present, but do not exceed about 1250 parts per million by weight of the resin.

13. The resin composition of claim 12, wherein said polyester comprises linear polyesters or branched polyesters.

14. The resin composition of claim 12, wherein said polyester comprises polyethylene terephthalate, copolymers of polyethylene terephthalate, polyethylene naphthalate, copolymers of polyethylene naphthalate, polybutylene terephthalate, copolymers of polybutylene terephthalate, polytrimethylene terephthalate, or copolymers of polytrimethylene terephthalate.

15. The resin composition of claim 12, wherein said effective amount of iron particles is from about 50 to about 2500 parts per million by weight of the resin.

16. The resin composition of claim 12, wherein said iron particles have a particle size range of about 20 to about 70 microns.

17. The resin composition of claim 12, wherein particles of less than about 20 microns in size do not exceed about 800 parts per million by weight of the resin.

18. The resin composition of claim 12, wherein said oxygen-scavenging particles are pre-treated with one or more reaction-enhancing agents.

19. The resin composition of claim 12, wherein bottles produced from said resin have a Hunter haze value of about 10% or less.

20. A resin composition comprising a film-forming polyester and from about 50 to about 2500 parts by weight of oxygen-scavenging iron particles per million parts by weight of the resin, wherein the concentration of iron particles of less than about 25 microns in size does not exceed about 1250 parts per million by weight of the resin.

21. The resin composition of claim 20, wherein said polyester comprises linear polyesters or branched polyesters.

22. The resin composition of claim 20, wherein said polyester comprises polyethylene terephthalate, copolymers of polyethylene terephthalate, polyethylene naphthalate, copolymers of polyethylene naphthalate, polybutylene terephthalate, copolymers of polybutylene terephthalate, polytrimethylene terephthalate, or copolymers of polytrimethylene terephthalate.

23. The resin composition of claim 20, wherein said iron particles have a particle size range of from about 20 to about 70 microns.

24. The resin composition of claim 20, wherein particles of less than about 20 microns in size do not exceed about 500 parts per million by weight of the resin.

25. The resin composition of claim 20, wherein said oxygen-scavenging particles are pre-treated with one or more reaction-enhancing agents.

26. The resin composition of claim 20, wherein bottles produced from said resin have a Hunter haze value of about 10% or less.

27. A polyester resin composition for use in forming transparent articles having low haze, the resin composition comprising from about 50 to about 2500 parts by weight of iron particles per million by weight of the resin, wherein said transparent articles have a Hunter haze value of about 10% or less.

28. The resin composition of claim 27, wherein said polyester comprises polyethylene terephthalate, copolymers of polyethylene terephthalate, polyethylene naphthalate, copolymers of polyethylene naphthalate, polybutylene terephthalate, copolymers of polybutylene terephthalate, polytrimethylene terephthalate, or copolymers of polytrimethylene terephthalate.

29. The resin composition of claim 27, wherein said iron particles have a particle size distribution such that particles of less than about 25 microns in size do not exceed a concentration defined by the formula $$ppm=512.3\times d$$

wherein ppm is the approximate concentration of particles of less than about 25 microns in size in parts per million by weight, and d is the apparent density of the particles of less than about 25 microns in size in grams per cubic centimeter.

30. A method for incorporating high levels of oxygen-scavenging particles into a film-forming polyester resin composition with low haze comprising the steps of:

providing an effective amount of oxygen-scavenging particles comprising at least one oxygen-scavenging element capable of reacting with molecular oxygen, wherein the particles have a particle size distribution such that particles of greater than and less than about 25 microns in size are present, but those particles less than about 25 microns in size do not exceed a concentration defined by the formula $$ppm = 512.3 \times d$$

wherein ppm is the approximate concentration of particles of less than about 25 microns in size in parts per million by weight, and d is the apparent density of the particles of less than about 25 microns in size in grams per cubic centimeter;

adding said oxygen-scavenging particles to a polyester resin composition during one or more of the process steps of
    melt phase polymerization of the polyester;
    post polymerization and prior to pelletization;
    solid state polymerization of the polyester; and
    extrusion.

31. The method of claim 30, wherein said step of adding oxygen-scavenging particles to a polyester resin composition produces a masterbatch of oxygen-scavenging resin; and wherein said method further comprises the step of adding said masterbatch to additional resin.

32. The method of claim 30, wherein said polyester resin comprises polyethylene terephthalate, copolymers of polyethylene terephthalate, polyethylene naphthalate, copolymers of polyethylene naphthalate, polybutylene terephthalate, copolymers of polybutylene terephthalate, polytrimethylene terephthalate, or copolymers of polytrimethylene terephthalate.

33. The method of claim 30, wherein said oxygen-scavenging particles comprise oxidizable forms of calcium, magnesium, scandium, titanium, vanadium, chromium, manganese, iron, cobalt, nickel, copper, silver, zinc, tin, aluminum, antimony, germanium, silicon, lead, cadmium, rhodium, or combinations thereof.

34. The method of claim 30, wherein said oxygen-scavenging element comprises iron.

35. The method of claim 30, wherein said effective amount of oxygen-scavenging particles is from about 50 to about 2500 parts per million by weight of the resin.

36. The method of claim 30, wherein said particles of less than about 25 microns in size have an apparent density of about 2.44 grams per cubic centimeter.

37. The method of claim 30, wherein particles of less than about 20 microns in size have an apparent density of about 2.44 grams per cubic centimeter, and do not exceed a concentration of about 800 parts per million by weight of the resin.

38. The method of claim 30, wherein said oxygen-scavenging particles are pre-treated with one or more reaction-enhancing agents.

39. The method of claim 30, wherein bottles produced from said resin have a Hunter haze value of about 10% or less.

40. A resin composition comprising:
  a film-forming polyester; and
  particulates comprising oxygen-scavenging particles capable of reacting with molecular oxygen; wherein the particulates have a particle size distribution such that particles of greater than and less than about 25 microns in size are present, but those particles less than about 25 microns in size do not exceed a concentration defined by the formula $$ppm = 512.3 \times d$$

wherein ppm is the approximate concentration of particles of less than about 25 microns in size in parts per million by weight, and d is the apparent density of the particles of less than about 25 microns in size in grams per cubic centimeter.

* * * * *